United States Patent
Schöder et al.

(10) Patent No.: US 6,277,027 B1
(45) Date of Patent: Aug. 21, 2001

(54) HYDRODYNAMIC TORQUE CONVERTER WITH CONNECTING ELEMENTS ATTACHED BY OUTWARD PRESSINGS

(75) Inventors: Bernd Schöder, Münnerstadt; Ruthard Schneider, Königshofen, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/514,003

(22) Filed: Feb. 25, 2000

Related U.S. Application Data

(62) Division of application No. 09/263,381, filed on Mar. 5, 1999, now abandoned.

(30) Foreign Application Priority Data

Mar. 19, 1998 (DE) ............................................. 198 12 062

(51) Int. Cl.⁷ ............................... F16H 41/24; F16D 3/06
(52) U.S. Cl. ......................... 464/98; 192/200; 192/3.28
(58) Field of Search .................................. 192/3.28, 3.29, 192/3.3, 70.16, 70.18, 200; 464/98, 99, 162

(56) References Cited

U.S. PATENT DOCUMENTS

| | | | | |
|---|---|---|---|---|
| 4,588,058 | * | 5/1986 | Aliouate | 192/3.28 |
| 5,762,172 | * | 6/1998 | Tsukamoto et al. | 192/3.29 |
| 5,813,505 | * | 9/1998 | Olsen et al. | 192/3.28 |

FOREIGN PATENT DOCUMENTS

| | | |
|---|---|---|
| 32 22 119 | 10/1983 | (DE). |
| G 87 10 517.9 | 11/1987 | (DE). |
| 44 32 624 | 4/1996 | (DE). |
| 195 81 383 T1 | 3/1997 | (DE). |
| 198 10 352 A1 * | 9/1999 | (DE). |
| 54-51278 | 9/1977 | (JP). |
| 6-6796 | 1/1994 | (JP). |
| 6-43409 | 6/1994 | (JP). |
| 8-42659 | 2/1996 | (JP). |
| WO 93/13339 | 7/1993 | (WO). |

* cited by examiner

*Primary Examiner*—Richard M. Lorence
(74) *Attorney, Agent, or Firm*—Cohen, Pontani, Lieberman & Pavane

(57) ABSTRACT

A hydrodynamic torque converter is embodied with a converter housing that, on its side facing a drive, has a substantially radially-running primary flange. Attached to the primary flange are a central pin for mounting and a holder for holding the converter housing on the drive, as well as a housing hub for mounting a transmission shaft of an output. At least one of the connecting elements on the primary flange (i.e., the holder, the housing hub and the central pin) is connected to the primary flange by an outward pressing. The holder, housing hub and central pin respectively establish a connection between the primary flange and the drive or output. This connection to the primary flange is created by material displacement into an opening in the connecting element in question, which opening is located on the side facing away from the connection. A rear-gripping device that grips behind the rear side of the connecting element is created at the free end of the outward pressing by means of material compression in the opposite direction and serves as to axially secure the connection of the respective components to each other.

1 Claim, 3 Drawing Sheets

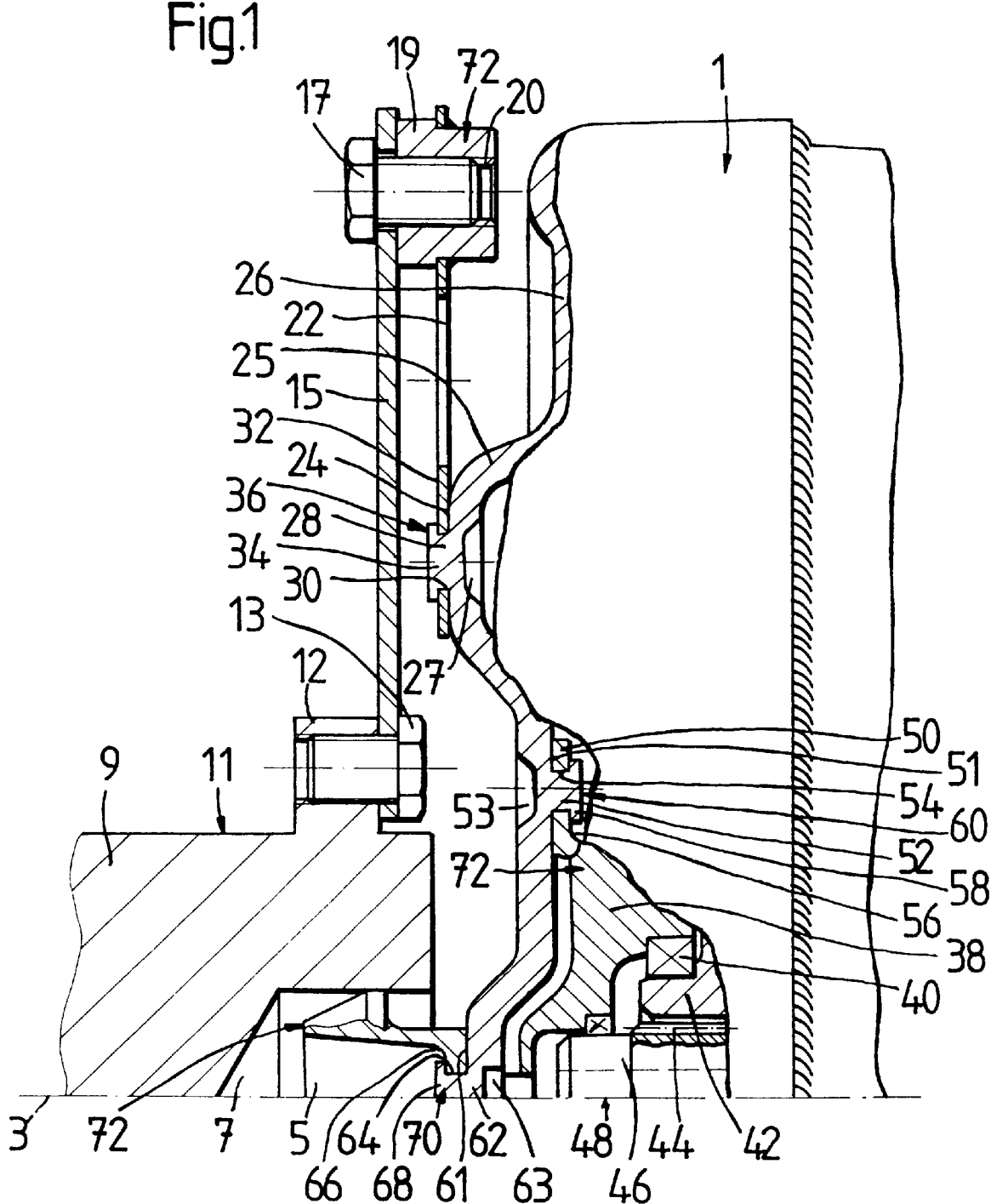

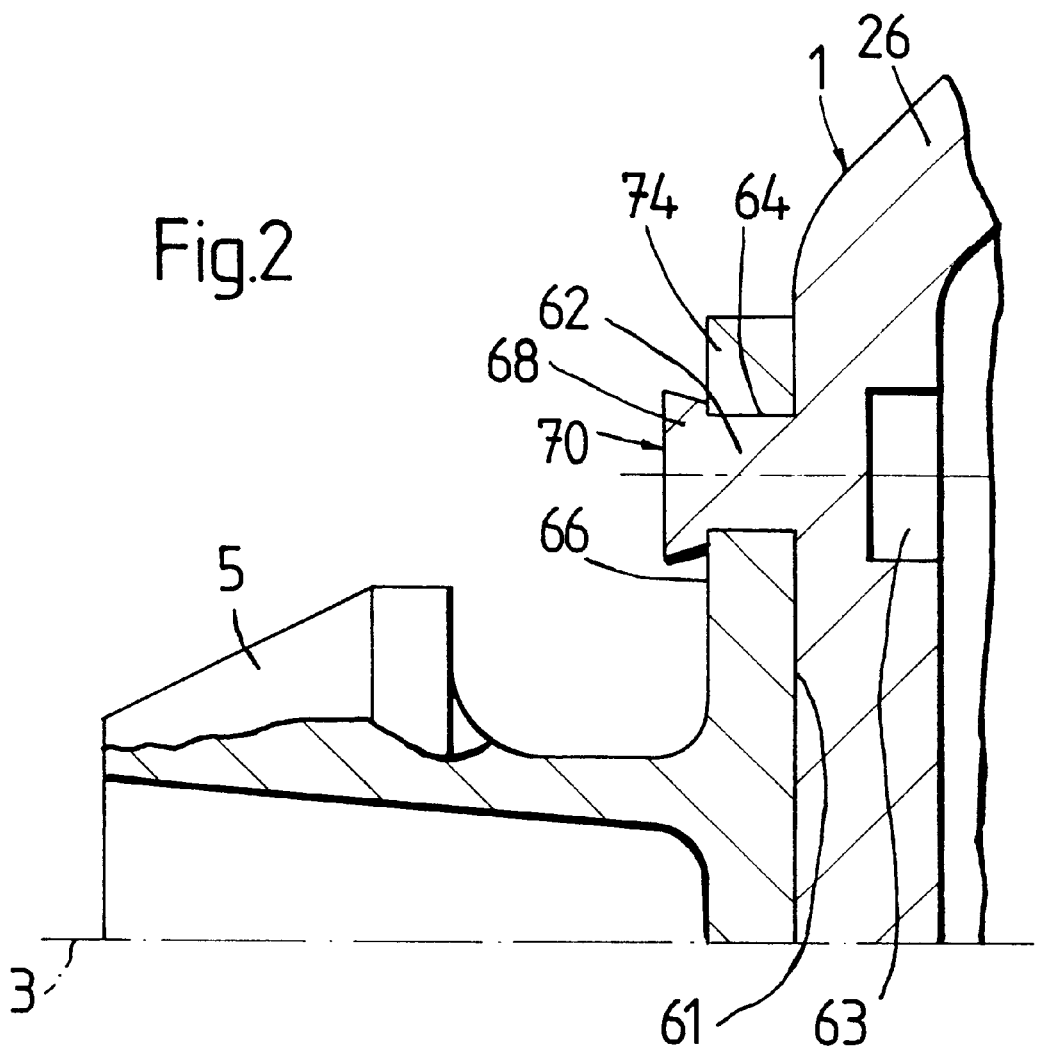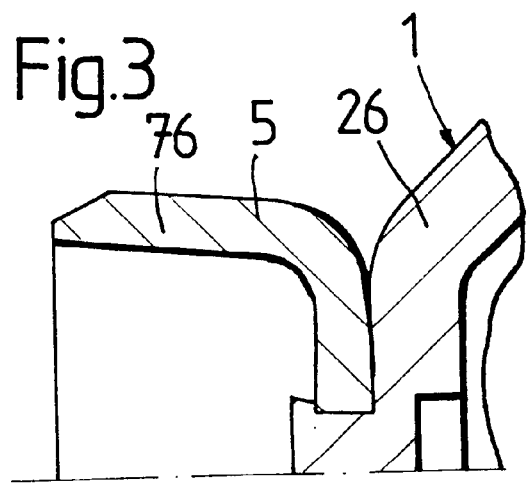

HYDRODYNAMIC TORQUE CONVERTER WITH CONNECTING ELEMENTS ATTACHED BY OUTWARD PRESSINGS

This is a division of application Ser. No. 09/263,381, filed Mar. 5, 1999 now abandoned.

BACKGROUND OF THE INVENTION

1. Field of the Invention

The invention relates to hydrodynamic torque converters and more particularly to a hydrodynamic torque converter utilizing outward pressings on the primary flange for connecting elements to the primary flange.

2. Description of the Related Art

FIG. 1, of DE 44 32 624 C1, shows a hydrodynamic torque converter with a converter housing that has, on its side facing a drive, e.g., the crank shaft of an internal combustion engine, a substantially radially-running primary flange, on which a central pin is provided for mounting in the crank shaft. Further, a housing hub is embodied on the primary flange radially outside the central pin and in a single piece with the central pin. Radially outside the housing hub there are holding means that serve, via a plate, to connect the converter housing to the drive. The connection, as shown in DE 32 22 119, is usually established via an axially elastic connecting plate, which is screwed radially inside to the crank shaft and radially outside to the holding means. This elastic connecting plate at least reduces the transmission of vibrations from the crank shaft with a component in the axial direction to the converter housing.

With respect to the torque converter described in DE 44 32 624 C1, it should be noted that the one-piece embodiment of the bearing journal and the housing hub results in a relatively complicated and massive component, which must then be attached to the relatively thinwalled primary flange by means of a welded seam. The plate with the holding means is also attached to the primary flange by welded seams. The welded seams, however, create the problem of a thermally uneven load of the primary flange, so that the danger of deformation exists. Moreover, imbalances are introduced into the converter housing, which must be eliminated by subsequent balancing measures. Overall, the embodiment of a torque converter described in the aforementioned patent document represents a relatively complicated and expensive design, in terms of production technology, and raises problems in accommodating connecting elements, such as the holding means, the housing hub or the central pin, on the primary flange of the converter housing.

The housing hub holds, via a bearing, a turbine hub of the turbine wheel. In turn, the turbine hub holds, via a tooth system, a gear input shaft in a rotation-proof fashion. The gear input shaft serves as the output of the hydrodynamic torque converter.

Utility Patent DE 87 10 517 describes and depicts a primary flange of a hydrodynamic torque converter, on which an outward pressing is created by means of material displacement starting from the side of a drive. The outward pressing penetrates an opening in an adjacent part, here, an element of a torsional vibration damper. A rear-gripping means, which grips behind the rear side of the element of the torsional vibration damper, is then created on the outward pressing by means of material compression in the opposite direction. The rear-gripping means acts as an axial securing means to axially secure the element of the torsional vibration damper relative to the primary flange. The torsional vibration damper is thus attached to the primary flange via a rivet-like connection, without suffering the disadvantages of a rivet, i.e., lack of tightness on the primary flange in the rivet extension area. However, the Utility Patent does not point to an advantageous attachment of connecting elements to the primary flange.

SUMMARY OF THE INVENTION

It is therefore an object of the present invention to embody a hydrodynamic torque converter such that connecting elements, such as the holding means, the housing hub and the central journal, can be connected to a primary flange in a simple manner.

According to an embodiment of the present invention, at least one connecting element is attached to the primary flange by the creation of at least one outward pressing on the primary flange. As a result, since material is displaced into an opening in the connecting element on the side of the primary flange that faces away from the connection, a type of riveting is created, while the pressure tightness of the converter housing is maintained. To axially secure the connection achieved in this manner, the outward pressing is subjected to material compression in the opposite direction, so that a rear-gripping means is formed, which grips behind the rear side of the connecting element penetrated by the outward pressing. This rear-gripping means prevents any shifting motion of the connecting element. A secure connection is thus established. The aforementioned material displacement is preferably carried out by means of a deep drawing process.

The connecting elements can, for example, be holding means, into which it is possible to introduce attachment elements of an axially elastic connecting plate connected to the crank shaft. The connecting element can also be a central pin, which is held in a corresponding recess in the crank shaft of an internal combustion engine. Both of these connecting elements act between the drive and the converter housing, whereas a housing hub, for example, serves to accommodate the gear input shaft and, therefore, the output. Thus, the housing hub is also a connecting element of the converter housing, specifically, an output-side connecting element.

According to the invention, the connection of the connecting elements to the converter housing via outward pressings with rear-gripping means is a cost-saving feature for manufacturing assembly. Furthermore, it is advantageous that welded seams, which are otherwise commonly used for pressure-tight connections, can be eliminated. As a result, thermal deformation phenomena and welding-related imbalances do not occur on the primary flange. Thus, no subsequent adjustment of the converter housing is necessary to permit good centering of the individual components relative to each other.

The holding means that serve as connecting elements are preferably accommodated on an axially flexible plate. Such a plate is almost ideally suited for placement on and attachment to outward pressings. In addition, the plate supplements, with its own axial elasticity, the axial elasticity of the axially elastic connecting plate usually connected to the crank shaft. As a result, there is even lower spring rigidity at the connection of the converter housing to the drive. This is especially advantageous when the crank shaft of the drive is subject to relatively strong vibrations with a component in the axial direction. Moreover, it is possible to extend the flexible plate that carries the holding means further radially inward, so that the flexible plate can accommodate a central pin in the extension area of the rotational axis of the converter housing. A journal shoulder projecting toward the flexible plate and penetrating an opening thereof can be provided on the central pin and, after embodiment of a radial expansion, will axially secure the central pin to the flexible plate. In such an embodiment of the flexible plate with holding means and a central pin, these two connecting elements can be accommodated in modular fashion on the converter housing, preferably on an axial projection of the primary flange running in the direction of the drive.

It is also conceivable, of course, to attach the central pin to the primary flange by creating an outward pressing on the primary flange by means of material displacement toward the drive. The outward pressing projecting toward the drive thereby penetrates an opening in the central pin and, after the embodiment on the outward pressing of rear-gripping means that act on the rear side of the central pin, holds the central pin securely on the outward pressing. A conventional embodiment of the central pin is conceivable, according to the invention, in the form of a pot-shaped drawn part open toward the drive, which embodiment is by nature relatively light and easy to manufacture.

Equally advantageous is a central pin with a journal flange that extends radially outward relative to the central pin and has a plurality of openings, into which a plurality of outward pressings on the primary flange can be inserted. As soon as the rear-gripping means are produced on the outward pressings, the central pin is securely held on the primary flange.

When the outward pressings are embodied in the direction of the transmission side, and the housing hub has a radially outward projection with openings for the outward pressings, the pressings can be used to attach the housing hub to the primary flange. Once the rear-gripping means are embodied on these outward pressings, and the housing hub is put in place, the housing hub is held in a rotation-proof and axially secured manner on the primary flange. Thus, the housing hub can be prefabricated independently of the primary flange, and subsequently attached thereto. This results in advantages with respect to production technology.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings wherein like reference numerals denote similar components throughout the views:

FIG. 1 is a partial sectional view of areas within a converter housing where connecting elements are to be attached to a primary flange, according to an embodiment of the present invention;

FIG. 2 is an enlarged detail view of the area of the primary flange with a central pin as the connecting element, having a journal flange according to an embodiment of the invention;

FIG. 3 is another embodiment of the central pin according of the invention; and

DETAILED DESCRIPTION OF PREFERRED EMBODIMENTS

Figure 4:
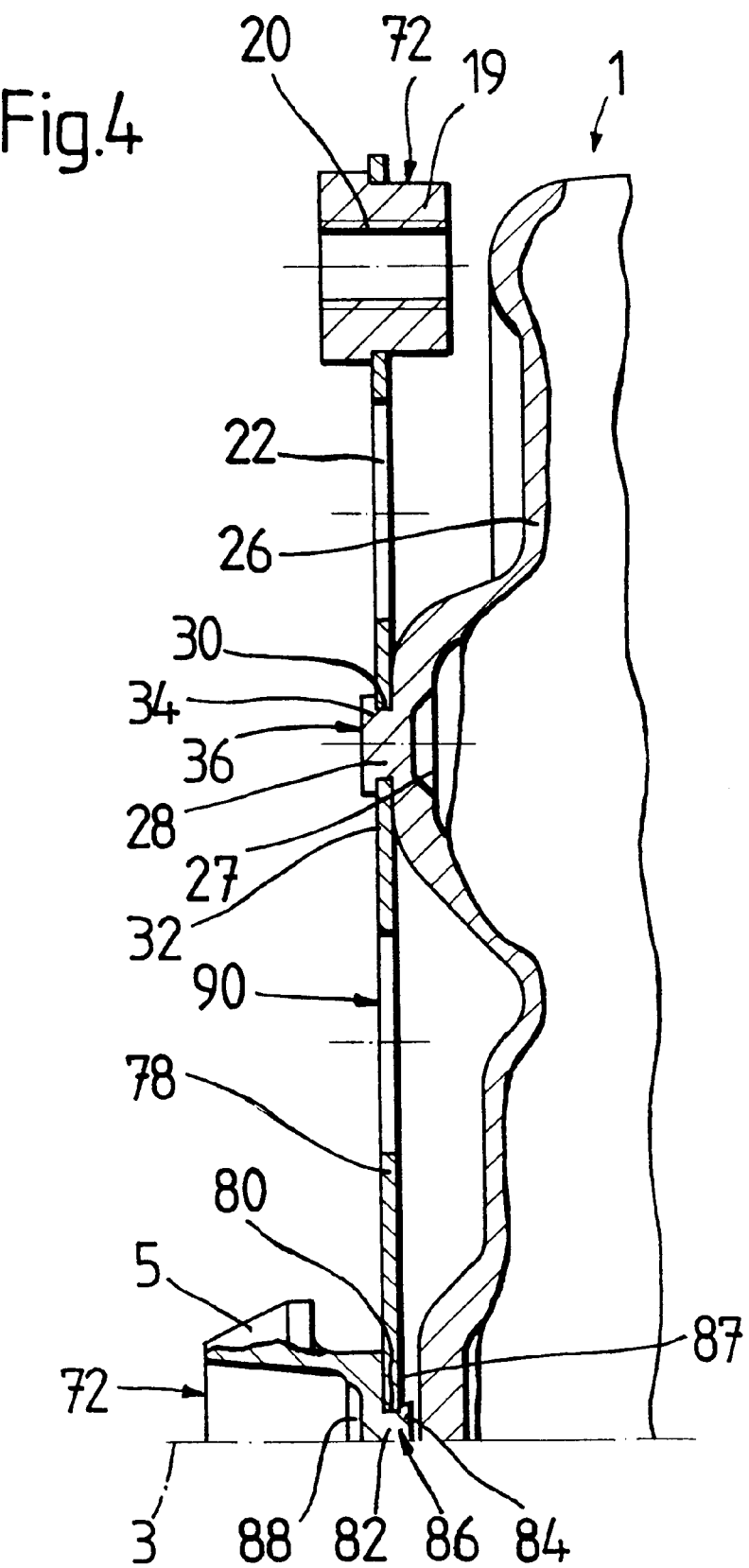
FIG. 4 is a partial sectional view of a modular component with several connecting elements according of an embodiment of the invention.

FIG. 1 shows part of a converter housing 1 of a hydrodynamic torque converter, whereby the converter housing 1 is movable around a rotational axis 3. The converter housing 1 has, in the area surrounding the rotational axis 3, a central pin 5, which engages into a recess 7 of a crank shaft 9 of a drive 11, e.g., an internal combustion engine. The crank shaft 9 has a flange 12 on its converter-side end to which a connecting plate 15 is secured via attachment elements 13. Attachment element 13 is preferably screws. The connecting plate 15 is preferably axially elastic and serves in its radially outer area to connect the converter housing 1 to the crank shaft 9 via attachment means 17, preferably screws. The threaded shaft of the attachment means 17 is thereby screwed into an internal thread 20 of the holding means 19, which is attached to an axially flexible plate 22. The plate 22 has a connection 24 to the primary flange 26 in the radially central area of a primary flange 26, which is embodied in this area with an axial projection 25. On the side of the primary flange 26 that faces away from the crank shaft 9, a material displacement 27 toward the crank shaft 9 is undertaken, which creates a journal-like outward pressing 28. The outward pressing 28 protrudes relative to the side of the primary flange 26 facing the crank shaft 9 and penetrates an opening 30 in the flexible plate 22. When a radial enlargement of the outward pressing 28 is created due to material compression in the opposite direction, the radial enlargement serves as the rear-gripping means 34 that grips behind the rear side 32 of the flexible plate 22. Plate 22 is axially secured by axial securing means 36 on the primary flange 26.

Radially inside the connection 24 is a housing hub 38, which holds, via a bearing element 40, a turbine hub 42 of a turbine wheel (not shown) embodied in the usual manner. This turbine hub 42 is engaged via a tooth system 44 with a transmission input shaft 46, which acts as the output 48 for the torque converter. The housing hub 38 has an outwardly-running radial projection 50 with openings 54. From the crank-shaft side, material displacements 53 are created. Specifically, one material displacement 53 is undertaken for each opening 54. As in the case of the outward pressing 28 discussed above, this is preferably done by means of a deep drawing process. Due to the material displacement 53 undertaken from the side of the crank shaft 9, a journal-like outward pressing 52 is formed on the opposite side of the primary flange 26. Pressing 52 penetrates the associated opening 54 of the radial projection 50 of the housing hub 38 and, after material compression in the opposite sense, comes to rest as the rear-gripping means 58 on the rear side 56 of the radial projection 50 and thus forms an axial securing means 60 of the housing hub 38 on the primary flange 36. Further radially inside the connection 51 established between the primary flange 26 and the housing hub 38, there is a third connection 61 and a material displacement 63 is undertaken on the primary flange 26 in the radial extension area of the rotational axis 3; specifically, from the side of the primary flange 26 facing away from the crank shaft 9 toward the crank shaft 9. As a result, a journal-like outward pressing 62, which engages into a corresponding opening 64 in the central pin 5 is created on the primary flange 26 on its side facing the crank shaft 9. As soon as the outward pressing 62 is radially expanded at its free end by material compression in the opposite direction, it forms, on the rear side 66 of the central pin 5, the rear-gripping means 68, which serves as the axial securing means 70 of the central pin 5 on the primary flange 26.

The holding means 19, like the central pin 5, constitutes a connecting element 72 connected to the drive 11 of the converter housing 1, while the housing hub 38, due to its contact 5 with the output 48, acts as the output-side connecting element 72.

FIG. 2 shows an enlarged view of the area of the primary flange 26 that accommodates the central pin 5. Unlike in the embodiment in FIG. 1, here the central pin 5 has a journal flange 74 extending radially outward, in which a plurality of openings 64 are embodied.

On the side of the primary flange 26 facing away from the central pin 5, and in the radial extension area of each opening 64, a material displacement 63 is undertaken, which creates the journal-like outward pressing 62 that penetrates the corresponding opening 64 in the journal flange 74. Here, too, as in the case of the connection of the central pin 5 shown in FIG. 1, each outward pressing 62 is radially expanded by material compression at its free end such that an axial securing 70 is created by means of the rear-gripping means 68 that grip behind the rear side 66 of 15 the journal flange 74. Axial securing 70 prevents detachment of the central pin 5 from the primary flange 26.

The mariner in which the central pin 5 is connected to the primary flange 26 of the converter housing 1 in FIG. 3 corresponds to that in FIG. 1; however, the central pin 5 is a pot-shaped drawn part 76, which is easy to produce and has low mass.

A further cost-saving embodiment is shown in FIG. 4. In this case, the axially flexible plate 22 has a radial extension 78, radially inside its connection 24 to the primary flange 26. Radial extension 78 extends to the rotational axis 3 and has, in the extension area of the latter, a further opening 80. The opening 80 serves to hold a journal shoulder 82 on the central pin 5. The journal shoulder 82 is created by material displacement 88 from the side facing the drive. Pressurization of the journal shoulder 82 in the opposite direction results, in a radial expansion 84 due to compression. Radial extension 84 comes to rest on the primary-flange side 87 of the plate 22 and acts as the axial securing means 86, which prevents the detachment of the central pin 5 from the flexible plate 22. In this way, a connecting element module 90 is created, which carries the holding means 19 as the first connecting element 72 and the central pin 5 as the second connecting element 72 and can be prefabricated before attachment to the primary flange 26.

The invention is not limited by the embodiments described above which are presented as examples only but can be modified in various ways within the scope of protection defined by the appended patent claims.

I claim:

1. A hydrodynamic torque converter having a converter housing and a substantially radially-running primary flange on a side of the housing facing a drive, a central pin attached to the primary flange for mounting a holding device for attaching the converter housing to the drive and a housing hub attached to the primary flange for mounting a transmission shaft of an output, the hydrodynamic torque converter comprising:

at least one connecting element connected to the primary flange and thereby adapted to connect the converter housing to the drive, said at least one connecting element comprising one selected from a group consisting of the holding device, the housing hub and the central pin;

connection means for connecting the primary flange to the drive via said at least one connecting element and having a connection opening, said connection means comprising an axially flexible plate coupled to said at least one connecting element and extending radially inward from an axial projection of the primary flange to a rotational axis of the converter, said axially flexible plate having a further opening in the area of the rotational axis, said central pin having a journal shoulder projecting through said further opening toward the primary flange and an axial securing device comprising a radial expansion of said journal shoulder on the primary flange side of said axially flexible plate for axially securing said plate to said central pin;

at least one outward pressing formed on the primary flange by material displacement into said connection opening; and a rear gripping device formed at a free end of said at least one outward pressing by material compression in an opposite direction with respect to said material displacement for gripping behind a rear side of said axially flexible plate, said rear gripping device being an axial securing device axially securing said connection formed by said axially plate.

* * * * *